United States Patent [19]

Shupe

[11] Patent Number: 4,587,523
[45] Date of Patent: May 6, 1986

[54] RADAR RANGE TRACKING APPARATUS AND METHOD

[75] Inventor: Chester D. Shupe, Scottsdale, Ariz.

[73] Assignee: Motorola Inc., Schaumburg, Ill.

[21] Appl. No.: 479,227

[22] Filed: Mar. 28, 1983

[51] Int. Cl.[4] ............................................. G01S 13/18
[52] U.S. Cl. .................................. 343/7.3; 343/16 M
[58] Field of Search ............... 343/7.3, 7.4, 9 R, 16 M

[56] References Cited

U.S. PATENT DOCUMENTS

| 3,056,128 | 9/1962 | Ball et al. | 343/7.3 |
| 3,141,162 | 7/1964 | Moretti et al. | 343/7.3 X |
| 4,063,238 | 12/1977 | Conner, Jr. | 343/7.3 |
| 4,195,297 | 3/1980 | Conner, Jr. | 343/12 R |
| 4,219,812 | 8/1980 | Rittenbach | 343/7.3 |

Primary Examiner—Nelson Moskowitz
Assistant Examiner—B. E. Gregory
Attorney, Agent, or Firm—Jonathan P. Meyer

[57] ABSTRACT

A split gate, leading edge range tracking apparatus for use in coherent radar seekers is substantially balanced in noise. The early and late gate widths and channel gains are chosen to provide leading edge tracking while avoiding range drift during target fade. A relationship is derived whereby the ratio of the early and late gate widths equals the square root of the ratio of the late and early gate channel gains.

12 Claims, 6 Drawing Figures

RADAR RANGE TRACKING APPARATUS AND METHOD

FIELD OF THE INVENTION

The present invention relates, in general, to an apparatus and method for range tracking in a coherent radar. More particularly, the present invention relates to a split gate, leading edge range tracking apparatus and method exhibiting substantially zero range drift during target fade.

BACKGROUND OF THE INVENTION

A range tracking system is used to provide an accurate gating pulse for an angle tracking system so that the later system receives only, or primarily, energy from a designated target. Split gate range tracking systems generally sample the incoming video signal at a first location (the early gate) and a second location (the late gate). The relative amplitudes of the two samples are used to determine whether the range gates are properly positioned to track the target. For instance, the two signal samples may be passed through substantially identical amplifying, filtering and detecting channels and applied to a difference circuit to generate a range error signal which can be used to alter the locations of the gates.

To avoid multipath and ECM interference, it is common practice to design a split gate range tracking apparatus to track on the leading edge of the target rather than on the centroid. This is accomplished by increasing the gain of the early gate channel with respect to the late gate channel. During periods when the target signal fades and only receiver noise is being gated however, this type of leading edge range tracking apparatus drifts to lower range due to the higher gain in the early gate channel. This results in loss of the target and necessitates repeated target acquisitions.

SUMMARY OF THE INVENTION

Accordingly, it is an object of the present invention to provide an improved split gate, leading edge range tracking apparatus.

A further object of the present invention is to provide an apparatus and method for leading edge range tracking in coherent radars which exhibits substantially zero range drift when gating receiver noise.

A particular embodiment of the present invention comprises a split gate leading edge range tracking apparatus having an early gate width $W_E$ and late gate width $W_L$, where $W_E$ is greater than $W_L$. The gain of the early gate channel is $A_E$, which is less than the gain of the late gate channel $A_L$. The ratio of $W_E$ to $W_L$ is defined as R and the ratio of $A_L$ to $A_E$ is set equal the square root of R. The choice of R governs the amount by which the tracking point is advanced with respect to the pulse width of the target return energy. The stated relationship between the gate widths and channel gains ensures that the tracking apparatus will not drift in range during target fade. In other words, the apparatus is balanced in noise while providing leading edge range tracking.

These and other objects and advantages of the present invention will be apparent to one skilled in the art from the detailed description below taken together with the drawings.

DETAILED DESCRIPTION OF THE INVENTION

Figure 1:
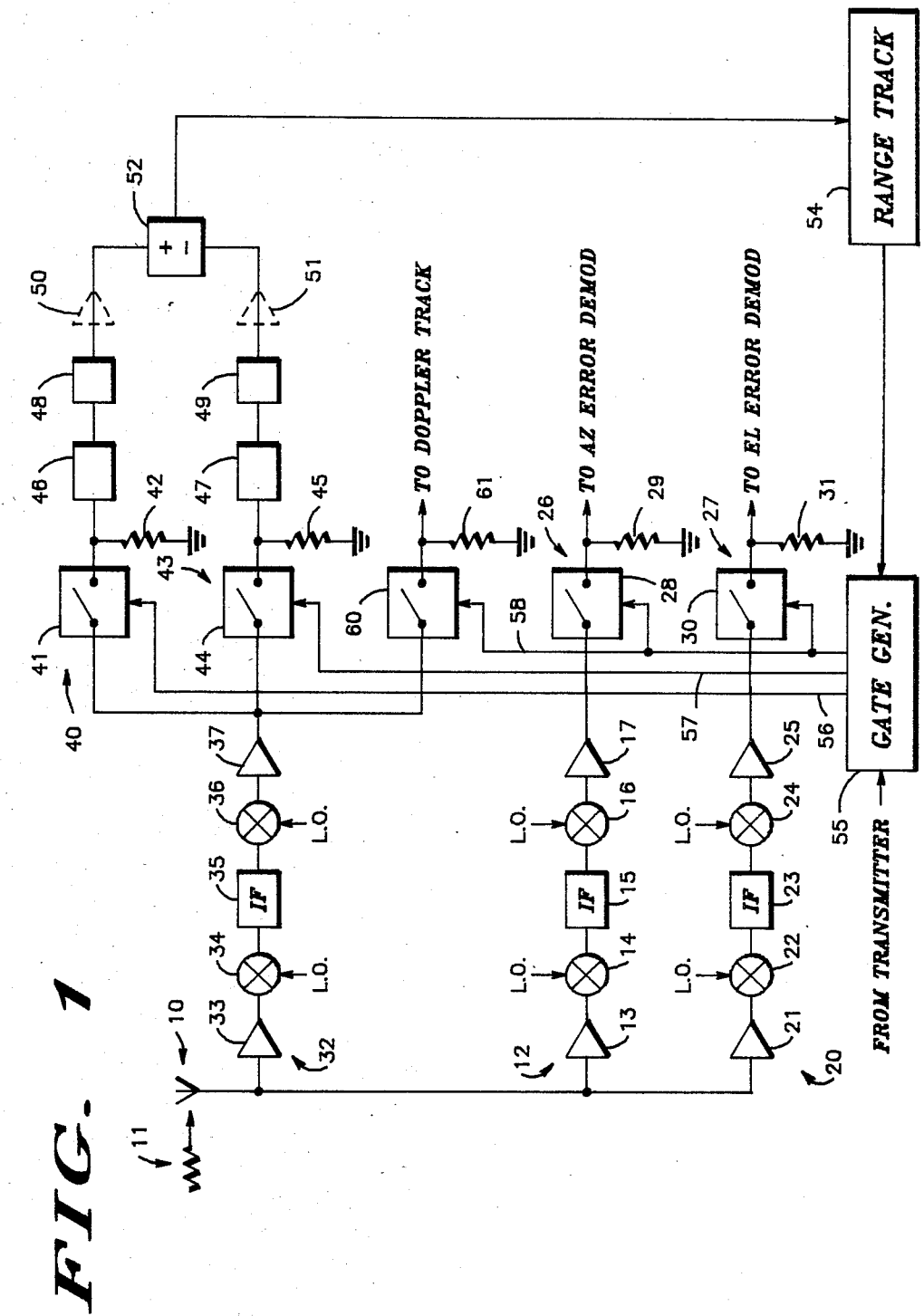
FIG. 1 is a block diagram of the receiver portion of a typical active radar seeker utilizing a range tracking apparatus according to the principles of the present invention.

A typical receiver section of an active radar seeker is shown in block diagram form in FIG. 1. The ultimate purpose of the receiver is to produce azimuth (AZ) and elevation (EL) error signals for use by guidance systems to guide the vehicle carrying the seeker to the designated target. A transmitter, which is not shown in FIG. 1, emits pulses of coherent or single frequency radar energy. An antenna 10, which is preferably an array at least a portion of which comprises a monopulse antenna, receives energy 11 which is reflected from the various objects within the beam of emitted energy.

In order to provide the azimuth error signal, a first angle error channel 12 is coupled to antenna 10 by means of any of a number of well known techniques. For instance, waveguides may be used to couple angle error channel 12 to the appropriate elements of the monopulse array with waveguide junctions used to provide the proper mixing and phasing of the signals from the several elements of the array to form the azimuth error signal. The signal is initially amplified by an RF amplifier 13, and is then down converted in mixer 14 by means of a signal from a local oscillator (L.O.). Next, the signal is passed through an IF stage 15 in which various filtering and amplification functions take place. The resulting signal is then down converted a second time in mixer 16, again by means of a signal from a local oscillator. Finally, the azimuth error signal is amplified by a video amplifier 17 and is then in the form of an angle error video signal. The details of the apparatus used to convert the incoming RF signal to a video signal are subject to wide variation and the apparatus shown here is by way of example only.

In order to provide the elevation error signal, a second angle error channel 20 is also coupled to antenna 10. Again, the signal is passed through an RF amplifier 21, a mixer 22, an IF stage 23, a mixer 24 and a video amplifier 25. The azimuth and elevation video error signals produced by channels 12 and 20 respectively, contain all the information necessary to guide the vehicle carrying the seeker to the designated target. However, they also include angle error information from all of the other objects in the radar beam.

In order to track a particular target it is necessary to gate, or turn on and off, the angle error information before it reaches the seeker guidance systems. If the range to the designated target is known, it is possible to turn on the angle error information only during that short period of time during which pulse return energy is being received from the designated target and other objects at the same range, thus greatly improving the signal to noise ratio of the angle error information. This switching function is accomplished by means of a first sample gate 26 coupled to first angle error channel 12 and a second sample gate 27 coupled to second angle error channel 20. Sample gate 26 comprises an electrically controlled switch 28 and a load resistor to ground 29. Similarly, second sample gate 27 comprises an electrically controlled switch 30 and a load resistor to ground 31. The gated angle error information appearing at the outputs of sample gates 26 and 27 is passed to demodulation circuits and then to the seeker guidance circuits.

In order to provide the range information necessary to properly gate the angle error information, a range channel 32 is coupled to antenna 10. Preferably, range channel 32 is provided with the sum, or composite, output of the monopulse array. The incoming RF signal is first amplified by an RF amplifier 33 and is then down converted in a mixer 34 by means of a signal from a local oscillator. Next, the signal is passed through an IF stage 35 and is again down converted in mixer 36 by means of a signal from a local oscillator. Finally, a sum, or composite radar video signal is produced by video amplifier 37. Again, the preceding details are subject to wide variation.

The operation of a split gate, range tracking apparatus comprises sampling the incoming video signal at a first location, the early gate, and a second location, the late gate. In other words, an electrically controlled switch forming the early gate is closed, or turned on, for a predetermined length of time beginning at a predetermined delay after the seeker transmitter has emitted a radar pulse and a second electrically controlled switch forming the late gate is turned on for the same length of time immediately after the early gate has been turned off. After processing (e.g. filtering, amplifying and detecting) the two samples are compared. If the early gate signal is larger, this means that the target return energy overlaps more of the early gate than the late gate and that the delay time between the transmitter pulse and the closing of the early gate should be decreased. If the late gate signal is larger, this means that the target return energy overlaps more of the late gate than the early gate and the delay time between the transmitter pulse and the closing of the early gate should be increased. Such a range tracking apparatus will track the centroid of the target return energy. If it is desired to track the leading edge of the target return energy, a bias may be applied by increasing the gain of the early gate processing channel or by other methods. However, when the target return energy momentarily fades and the range gates are gating only receiver noise, this bias results in a drift of the range tracking apparatus toward shorter range. This may cause loss of target lock and necessitate repeated target acquisition.

In a split gate, range tracking apparatus according to the principles of the present invention an early gate 40 comprises an electrically controlled switch 41 and a load resistor to ground 42. A late gate 43 comprises an electrically controlled switch 44 and a load resistor to ground 45. Both early gate 40 and late gate 43 are coupled to the output of video amplifier 37. A Doppler processing apparatus 46 is coupled to the output of early gate 40 and comprises Doppler filters and amplifiers for eliminating signals with Doppler frequencies other than that of the designated target. This function will be more fully explained below. Similarly, a Doppler processing apparatus 47 is coupled to the output of late gate 43. Following Doppler processing apparatus 46, an amplitude detector 48 converts the video signal to a representation of the amplitude thereof. Similarly, an amplitude detector 49 is coupled to the output of Doppler processing apparatus 47. Early gate 40, Doppler processing apparatus 46 and amplitude detector 48 comprise an early gate channel which has an overall channel gain $A_E$. This gain is primarily determined by the gain of Doppler processing apparatus 46 and the characteristics of amplitude detector 48. Similarly, late gate 43, Doppler processing apparatus 47 and amplitude detector 49 comprise a late gate channel which has a gain $A_L$. As is discussed below it is necessary to precisely control the ratio between $A_E$ and $A_L$. This is most easily achieved by means of the amplifiers and filters comprising Doppler processing apparatus 46 and 47. Alternately, an amplifier 50 may be inserted in the early gate channel in the position indicated in phantom and an amplifier 51 may be inserted in the late gate channel in the position indicated in phantom. The gains of amplifiers 50 and 51 may be used to control the overall gains of the early and late gate channels, respectively.

The signals from the early and late gate channels are input to a difference circuit 52 which produces a signal proportional to the difference between the amplitudes of the gated and processed signal in the early gate channel and the gated and processed signal in the late gate channel. The resulting range error signal is input to a range track apparatus 54 which determines the proper delay between the transmitter pulse and the closing of the early gate. In other words, a positive range error signal indicates that the delay time should be decreased and a negative range error signal indicates that the delay time should be increased. The proper delay time is input from range track apparatus 54 to a gate generator 55, which also has an input from the transmitter, and which produces the gating pulses which cause electrically controlled switches 28, 30, 41 and 44 to close. An early gate pulse is coupled from gate generator 55 to early gate 40 by means of line 56 and a late gate pulse is coupled from gate generator 55 to late gate 43 by means of line 57. In addition, a target gate pulse is coupled from gate generator 55 to angle error gates 26 and 27 by means of line 58. The temporal relationship between the three gating pulses is described with reference to FIG. 2 below.

Finally, in order to ensure the operation of the seeker over a wide range of closing velocities, a Doppler tracking apparatus is included comprising an electrically controlled switch 60, a load resistor to ground 61 and a Doppler tracker. Switch 60 is coupled to the output of video amplifier 37 and, by means line 58, to gate generator 55. Therefore, switch 60 is controlled by the target gate pulse. The function of the Doppler tracking apparatus is to determine the closing velocity of the designated target, to calculate the resulting Doppler shift in the frequency of the pulse return energy and to compensate for that shift by controlling the frequency of at least one of the local oscillators used to down convert the RF signal. In other words, if the designated target has a Doppler shift of $\Delta f$ due to the closing velocity, then the doppler tracking apparatus will alter the frequency of the local oscillator a like amount, $\Delta f$, so that the resulting video signal exhibits substantially zero Doppler shift for the designated target. This adaptive compensation for various closing velocities allows the Doppler processing apparatus 46 and 47 in the range tracking apparatus to be designed with a relatively narrow passband, thus enhancing the performance of the range tracking apparatus.

Figure 2:
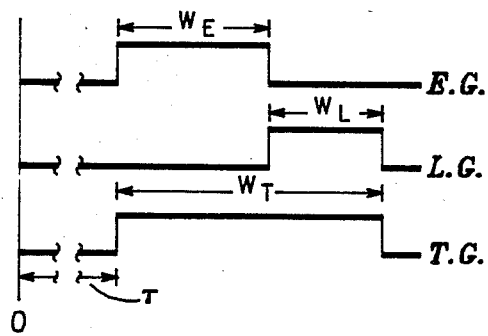
FIG. 2 is a timing diagram illustrating the relationships between the various gating pulses used in the apparatus of FIG. 1.

Referring now to FIG. 2, the timing of the various pulses produced by gate generator 55 of FIG. 1 is described with reference to a timing diagram. The reference point, or origin, of the timing diagram coincides with the beginning of a pulse of radar energy being emitted from the transmitter. After a delay time $\tau$, which is equal to twice the expected distance to the target divided by the speed of light, gate generator 55 produces an early gate pulse and a target gate pulse, labeled E.G. and T.G., respectively. The target gate pulse continues for a time $W_T$, which is referred to as the target gate width. Note that, generally, $\tau$ is much greater than $W_T$. Typically, the target gate width is chosen to be equal to the pulse width of the pulses emitted by the transmitter. This is to ensure the gating of the maximum amount of target return energy available while minimizing the amount of extraneous energy gated. However, since all real targets will have some finite extent in the range direction, the actual pulse return will be somewhat longer than the pulse width of the transmitted energy. It is the purpose of leading edge range tracking to locate the target gate pulse as nearly coincident with the leading edge of the pulse return energy as possible. Coincident with the leading edge of the target gate pulse, gate generator 55 produces an early gate pulse which extends for a time $W_E$, which is referred to as the early gate width. Coincident with the trailing edge of the early gate pulse gate generator 55 produces a late gate pulse, L.G., which has a width $W_L$. In the preferred embodiment of the present invention, $W_E + W_L = W_T$ and the leading edge of the early gate is coincident with the leading edge of the target gate, However, it is possible that neither of the above relationships will hold for every seeker designed according to the principles of the present invention.

Since the amplitude of the early gate signal at difference circuit 52 depends upon both $W_E$ and $A_E$ and since the amplitude of the late gate signal at subtraction circuit 52 depends upon both $W_L$ and $A_L$, all four of these parameters must be properly chosen for the range tracking apparatus to perform as desired. It is desired that the range error signal produced by difference circuit 52 be approximately equal to zero when the apparatus is tracking the leading edge of a designated target and that the range error signal also be equal to zero during periods of momentary target fade, when the early and late gates are gating only receiver noise. In order to properly balance these parameters, it is necessary to consider the effects of gating on the power versus frequency spectrums of both coherent and noise signals.

Figure 3:
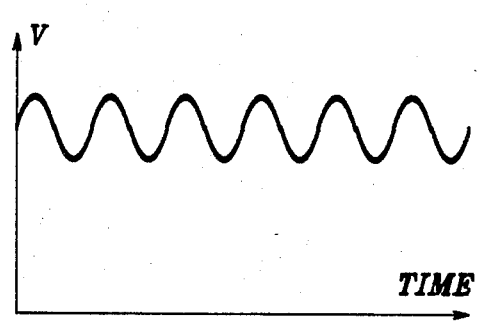
FIG. 3 is a graph of the voltage versus time waveform of a coherent radar signal.
Figure 4:
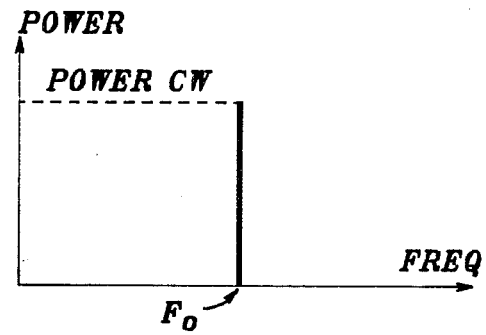
FIG. 4 is a graph of the power versus frequency spectrum of the signal of FIG. 3.
Figure 5:
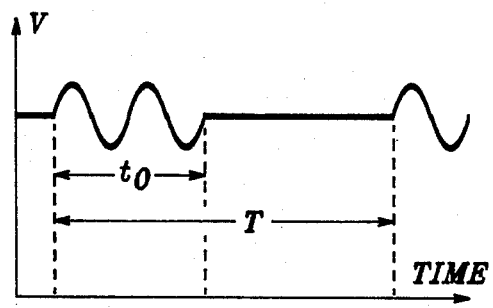
FIG. 5 is a graph of the voltage versus time waveform of a gated, coherent signal.
Figure 6:
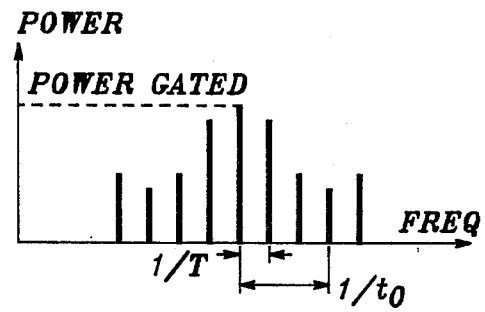
FIG. 6 is a graph of the power versus frequency of the signal of FIG. 5.

Referring now to FIG. 3, the voltage versus time waveform of a coherent, or single frequency, signal is shown in graphic form. As shown in FIG. 4, all of the power in the signal shown in FIG. 3 is concentrated in a single spectral line at the frequency $F_O$. If such a coherent signal is gated, as occurs in range tracking radars, the result is a voltage versus time waveform as shown in FIG. 5. The waveform is identical to that of FIG. 3 during the time, $t_O$, when the gate is closed and has only a dc component when the gate is open. The time between successive closings of the gate is T. The duty cycle of such a gated signal is defined as $t_O/T$. The power spectrum of the signal shown in FIG. 5 is depicted in FIG. 6. The spectrum has a number of single frequency components with different amplitudes. The component with the greatest amplitude is at a frequency $F_O$. The frequency spacing between adjacent components is $1/T$ and the spacing between the component with the maximum amplitude and the component with the minimum amplitude is $1/t_O$. Since the receiver in a coherent radar is tuned to the center of the received spectrum, that is to $F_O$, only the power in the central component of the spectrum is received. Applying Fourier analysis to determine the amplitude of this component, it is found that the power gated is equal to the power CW times the square of the duty cycle.

$$\text{Power Gated} = \text{Power } CW \cdot (t_O/T)^2 \qquad (1)$$

If the waveform of FIG. 3 is replaced with a typical noise waveform, and the same analysis applied to determine the degree to which gating decreases the power received a quite different result is achieved. The power spectrum of the ungated signal is a single valued function. That is, the noise signal has components at all frequencies and all of the components have the same amplitude, which is equal to the rms power of the signal. When the noise signal is gated the power will be reduced only by a factor equal to the duty cycle, since the signal is simply averaged by the gate. Thus, when the early and late gates are gating only receiver noise, equation (2) holds.

$$\text{Power Gated} = \text{Power } rms \cdot (t_O/T) \qquad (2)$$

Once the difference in the gated power for the coherent signal and noise signal cases is known, it is possible to derive the relationship between the four parameters $A_E$, $A_L$, $W_E$ and $W_L$ necessary for proper functioning. Recall that the objective is to provide a leading edge range tracking apparatus which is balanced in noise.

First, it is assumed that the early gate is wider than the late gate by some factor R.

$$W_E = RW_L \qquad (3)$$

Since the time between successive closings of the early and late gates (T) is determined by the pulse repetition rate of the radar and by $\tau$, which are the same for both the early and late gates, the ratio between the duty cycles of the early and late gates is determined entirely by the gate widths. Therefore, the duty cycle of the early gate is greater than the duty cycle of the late gate by the same factor R.

The condition which must be met to ensure drift free operation when gating noise is that the early gate power gated times the early gate gain squared equals the late gate power gated times the late gate gain squared.

$$\text{Power Gated } (E) \cdot A_E^2 = \text{Power Gated } (L) \cdot A_L^2 \qquad (4)$$

The power gated for each of the channels is calculated by substituting the appropriate gate width for $t_O$ in equation (2). With a further substitution using equation (3), it can be stated that:

$$\text{Power rms} \cdot \left\{ \frac{RW_L}{T} \right\} \cdot A_E^2 = \text{Power rms} \cdot \left\{ \frac{W_L}{T} \right\} \cdot A_L^2 \qquad (5)$$

Cancelling like terms on either side of equation (5) and taking the square root of both sides yields equation (6).

$$A_L = \sqrt{R}\, A_E \tag{6}$$

Thus, equations (3) and (6) state the required relationship between the four parameters $W_E$, $W_L$, $A_E$, and $A_L$ in order for the range tracking apparatus to be balanced in noise. It remains to be demonstrated, however, that such an apparatus will provide leading edge tracking.

Equation (4) also states the tracking condition when the apparatus is receiving target return energy, with the qualification that equation (1) is used to describe the power gated instead of equation (2) and that somewhat less than the entire early gate is overlapped by target energy. This last condition is an obvious result of leading edge tracking and requires that $t_O$ in equation (1) be replaced with a measure of the overlap $O_{LE}$ and not with $W_E$. In other words, the effective duty cycle of the early gate is altered by virtue of the fact that the early gate closes sometime before the leading edge of the target return energy occurs. Restating equation (4) with the indicated substitutions and a substitution based on equation (6), results in equation (7).

$$\text{Power } CW \cdot \left(\frac{O_{LE}}{T}\right)^2 \cdot A_E^2 = \text{Power } CW \cdot \left(\frac{W_L}{T}\right)^2 RA_E^2 \tag{7}$$

Cancelling like terms on either side of equation (7) and taking the square root of both sides produces equation (8).

$$O_{LE} = \sqrt{R}\, W_L \tag{8}$$

When it is assumed that the width of the target gate $W_T$ is equal to the sum of the early and late gate widths and is also equal to 1, it is possible to solve for the amount by which the closing of the early and target gates preceeds the arrival of the leading edge of the target return energy.

$$ADV = \left\{\frac{R}{R+1} - \frac{R}{R^2 + 2R + 1}\right\}^{\frac{1}{2}} \tag{9}$$

Equation (9) states the advance ADV of the target gate with respect to the target return energy in terms of a fraction of the target gate width.

Table I below, lists several typical values of ADV and the corresponding ratios of the gate widths and channel gains required to obtain that degree of advance and maintain balance in noise. It is found that an advance of 0.5 to 0.6 is usually satisfactory to obtain the advantages of leading edge tracking.

TABLE I

| $W_E/W_L$ | ADV. | $A_L/A_E$ |
|---|---|---|
| 1 | 0 | 1 |
| 1.5 | .11 | 1.22 |
| 2 | .20 | 1.41 |
| 3 | .32 | 1.73 |
| 4.5 | .43 | 2.12 |
| 6.8 | .54 | 2.61 |
| 10 | .62 | 3.16 |

TABLE I-continued

| $W_E/W_L$ | ADV. | $A_L/A_E$ |
|---|---|---|
| 15 | .70 | 3.87 |
| 20 | .74 | 4.47 |

While the invention has been particularly shown and described with reference to a preferred embodiment thereof, it will be understood by those skilled in the art that various other modifications and changes may be made to the present invention from the principles of the invention described above without departing from the spirit and scope thereof.

I claim:

1. A range tracking apparatus for processing a radar video signal comprising:
   an early gate channel for sampling the video signal, said early gate channel having a gate width $W_E$ and a channel gain $A_E$;
   a late gate channel for sampling the video signal, said late gate channel having a gate width $W_L$ and channel gain $A_L$; and
   means coupled to said early and late gate channels for producing a range error signal, $W_E$ being greater than $W_L$, $A_L$ being greater than $A_E$, and said range error signal being approximately equal to zero when the apparatus is processing only noise.

2. A range tracking apparatus according to claim 1 further comprising:
   gate generator means coupled to said early and late gate channels for generating at least an early gate signal and a late gate signal.

3. A range tracking apparatus according to claim 1 wherein $W_E = RW_L$ and $A_L = \sqrt{R}A_E$, where R is a variable greater than one.

4. In an active, coherent radar seeker, an apparatus for producing a target gating pulse comprising:
   means for generating at least an early gating pulse, a late gating pulse and a target gating pulse, said early gating pulse having a pulse width $W_E$ and said late gating pulse having a pulsd width $W_L$, $W_E$ being greater than $W_L$;
   means responsive to said early and late gating pulses to sample a radar video signal at a first location and a second location, respectively;
   means for applying a first gain $A_E$ to said first sample and a second gain $A_L$ to said second sample, $A_E$ being less than $A_L$; and
   means responsive to said first and second amplified samples for determining the positions of said gating pulses with respect to a reference pulse, the ratio of $W_E$ to $W_L$ and of $A_E$ to $A_L$ being chosen to provide that the positions of said gating pulses being substantially stable when said radar video is substantially all noise.

5. An apparatus according to claim 4 wherein the ratio of $W_E$ to $W_L$ is approximately equal to the square of the ratio of $A_L$ to $A_E$.

6. A receiver portion of an active coherent radar seeker comprising:
   antenna means for receiving radar energy;
   means for producing a composite radar video signal from said received radar energy;
   first gate means adapted to receive said composite radar video signal for producing a first sample thereof;

second gate means adapted to receive said composite radar video signal for producing a second sample thereof;

third gate means adapted to receive at least one angle error video signal for producing a sample thereof;

means for producing first and second range gate pulses and a target gate pulse, said first range gate pulse being coupled to said first gate means and having a pulse width $W_E$, said second range gate pulse being coupled to said second gate means and having a pulse width $W_L$, said target gate pulse being coupled to said third gate means, said pulse producing means being coupled to a transmitter portion of the seeker whereby said gating pulses are delayed with respect to the pulses of said transmitter by a determinable amount;

means coupled to said first gate means for applying a gain $A_E$ to said first sample;

means coupled to said second gate means for applying a gain $A_L$ to a second sample; and means responsive to said amplified first and second samples and coupled to said pulse producing means for determining the amount by which said gating pulses are delayed with respect to said transmitter pulses, said delay being substantially stable when said gates are gating only noise.

7. A receiver according to claim 6 further comprising:

fourth gate means for sampling said composite radar video signal, said fourth gate means being coupled to said target gate pulse; and Doppler tracking means coupled to said fourth gate means for responding to a Doppler component of said composite radar video and for controlling at least one local oscillator in said receiver.

8. A receiver according to claim 6 wherein:

said antenna means comprises a monopulse antenna;

said composite radar video signal comprises a sum channel video signal; and said at least one angle error video signal comprises an azimuth error video signal and an elevation error video signal.

9. A receiver according to claim 6 wherein said means for producing said target gate pulse includes means for generating said target gate pulse approximately equal in duration to the sum of said first and second range gate pulses.

10. A receiver according to claim 6 wherein the ratio of $W_E$ to $W_L$ is approximately equal to the square of the ratio of $A_L$ to $A_E$.

11. A method of producing a range error signal from a radar video signal comprising the steps of:

sampling said video signal at a first delay, said first sample having a width $W_E$;

sampling said video signal at a second delay, said second sample having a width $W_L$;

applying a gain $A_E$ to said first sample;

applying a gain $A_L$ to said second sample; and determining at least said first delay in response to a difference between said first and second amplified samples, said first delay being substantially stable when said video is substantially all noise.

12. A method according to claim 11 wherein:

$$W_E/W_L = \{A_L/A_E\}^2.$$

* * * * *